United States Patent [19]
Dixon

[11] Patent Number: 5,433,468
[45] Date of Patent: Jul. 18, 1995

[54] APPARATUS TO PRECLUDE THE THEFT OR UNAUTHORIZED USE OF A TRAILER

[76] Inventor: Joseph S. Dixon, Box 155, Brant, Alberta, Canada, T0L 0L0

[21] Appl. No.: 285,146

[22] Filed: Aug. 3, 1994

[51] Int. Cl.⁶ .............................................. B60D 1/06
[52] U.S. Cl. .................................................. 280/507
[58] Field of Search ............... 280/507, 504, 511, 512, 280/514; 70/14, 58

[56] References Cited

U.S. PATENT DOCUMENTS

| | | | |
|---|---|---|---|
| 2,571,349 | 10/1951 | Eckles | 280/507 |
| 3,605,457 | 9/1971 | Foster | 280/507 X |
| 3,884,055 | 5/1975 | Vuillemot | 280/507 X |
| 4,032,171 | 6/1977 | Allen et al. | 280/507 |
| 4,141,569 | 2/1979 | Dilk | 280/507 |
| 4,208,065 | 6/1980 | Hansen | 280/507 |
| 4,459,832 | 7/1984 | Avrea et al. | 280/507 X |
| 5,087,064 | 2/1992 | Guhlin | 280/507 |

*Primary Examiner*—Margaret A. Focarino
*Assistant Examiner*—F. Zeender

[57] ABSTRACT

An apparatus to preclude the theft or unauthorized use of a trailer comprising a cylindrical member formed of a rigid material positionable in a vertical orientation, the cylindrical member having a cylindrical side wall, a closed top in a generally spherical configuration and an open bottom, the cylindrical member having an upper extent positionable in the downwardly facing recess with the lower extent of the cylindrical member located therebeneath; a cross bar positionable in a horizontal orientation extending diametrically through the side wall of the cylindrical member with its lower edge located co-planar with the lower edge of the open end of the cylindrical member and an upper edge, an aperture extending through each end of the cross member at a location radially remote from the axis of the cylindrical member and the side wall of the cylindrical member; and a pair of rigid arms, each arm having a lower aperture at its lower end, the aperture of each arm positionable in axial alignment with an associated aperture of the cross member, upper apertures in the arms at the upper extents thereof positionable in axial alignment above the central axis of the cylindrical member, each of the arms being formed with a bend whereby the arms may extend upwardly then angled inwardly when the apertures at the upper ends of the arm are in axial alignment.

3 Claims, 3 Drawing Sheets

APPARATUS TO PRECLUDE THE THEFT OR UNAUTHORIZED USE OF A TRAILER

BACKGROUND OF THE INVENTION

1. Field of the Invention

The present invention relates to apparatus to preclude the theft or unauthorized use of a trailer and more particularly pertains to cover the hitch of a trailer in such a manner so as to preclude theft or unauthorized usage thereof.

2. Description of the Prior Art

The use of devices to deter the theft of cars, trucks, trailers and the like of a wide variety of designs and constructions is known in the prior art. More specifically, to deter the theft of cars, trucks, trailers and the like of a wide variety of designs and constructions heretofore devised and utilized for the purpose of discouraging theft or unauthorized usage of a wide variety of wheeled vehicles through various methods and apparatuses are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,087,064 to Guhlin an anti-theft and safety device for a ball and socket trailer hitch.

U.S. Pat. No. 4,794,769 to Persons discloses a ball hitch lock.

U.S. Pat. No. 4,538,827 to Plifka discloses a ball hitch trailer lock.

U.S. Pat. No. 4,186,575 to Bulle discloses a trailer hitch ring lock.

U.S. Pat. No. 3,822,900 to Peterson discloses an anti-theft trailer hitch.

In this respect, the apparatus to preclude the theft or unauthorized use of a trailer according to the present invention substantially departs from the conventional concepts and designs of the prior art, and in doing so provides an apparatus primarily developed for the purpose of covering the hitch of a trailer in such a manner so as to preclude theft or unauthorized usage thereof.

Therefore, it can be appreciated that there exists a continuing need for a new and improved apparatus to preclude the theft or unauthorized use of a trailer which can be used for covering the hitch of a trailer in such a manner so as to preclude theft or unauthorized usage thereof. In this regard, the present invention substantially fulfills this need.

SUMMARY OF THE INVENTION

In view of the foregoing disadvantages inherent in the known types of apparatus to deter the theft of cars, trucks, trailers and the like of a wide variety of designs and constructions now present in the prior art, the present invention provides an improved apparatus to preclude the theft or unauthorized use of a trailer. As such, the general purpose of the present invention, which will be described subsequently in greater detail, is to provide a new and improved apparatus to preclude the theft or unauthorized use of a trailer and method which has all the advantages of the prior art and none of the disadvantages.

To attain this, the present invention essentially comprises a new and improved apparatus to preclude the theft or unauthorized use of a trailer comprising, in combination, a cylindrical member formed of a rigid material positionable in a vertical orientation, the cylindrical member having a cylindrical side wall, a closed top in a generally spherical configuration and an open bottom, the cylindrical member having an upper extent positionable in the downwardly facing recess of the ball of a trailer hitch with the lower extent of the cylindrical member located therebeneath; a cross bar positionable in a horizontal orientation extending diametrically through the side wall of the cylindrical member with its lower edge located co-planar with the lower edge of the open end of the cylindrical member and the upper edge of the cross member in proximity to the lower open end of the recess of the ball, an aperture extending through each end of the cross member at a location radially remote from the axis of the cylindrical member and the side wall of the cylindrical member; a pair of rigid arms, each arm having a lower aperture at its lower end, the aperture of each arm positionable in axial alignment with an associated aperture of the cross member, upper apertures in the arms at the upper extents thereof positionable in axial alignment above the central axis of the cylindrical member with the ball of the trailer hitch therebetween, each of the arms being formed with a bend in its central extent whereby the arms may extend upwardly then angled inwardly when the apertures at the upper ends of the arm are in axial alignment; and a padlock positioned through the upper apertures at the upper ends of the arms when in a locked position to preclude the coupling of the ball of the trailer hitch between the cylindrical member and arms to a mating component of a trailer hitch.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved apparatus to preclude the theft or unauthorized use of a trailer which have all the advantages of the prior art to deter the theft of cars, trucks, trailers and the like of a wide variety of designs and constructions and none of the disadvantages.

It is another object of the present invention to provide a new and improved apparatus to preclude the theft or unauthorized use of a trailer which may be easily and efficiently manufactured and marketed.

It is further object of the present invention to provide a new and improved apparatus to preclude the theft or unauthorized use of a trailer which are of durable and reliable constructions.

An even further object of the present invention is to provide a new and improved apparatus to preclude the theft or unauthorized use of a trailer which are susceptible of a low cost of manufacture with regard to both materials and labor, and which accordingly are then susceptible of low prices of sale to the consuming public, thereby making such apparatus to preclude the theft or unauthorized use of a trailer economically available to the buying public.

Still yet another object of the present invention is to provide a new and improved apparatus to preclude the theft or unauthorized use of a trailer which provide in the apparatuses and methods of the prior art some of the advantages thereof, while simultaneously ,overcoming some of the disadvantages normally associated therewith.

Still another object of the present invention is to cover the hitch of a trailer in such a manner so as to preclude theft or unauthorized usage thereof.

Lastly, it is an object of the present invention to provide new and improved apparatus to preclude the theft or unauthorized use of a trailer comprising a cylindrical member formed of a rigid material positionable in a vertical orientation, the cylindrical member having a cylindrical side wall, a closed top in a generally spherical configuration and an open bottom, the cylindrical member having an upper extent positionable in the downwardly facing recess with the lower extent of the cylindrical member located therebeneath; a cross bar positionable in a horizontal orientation extending diametrically through the side wall of the cylindrical member with its lower edge located co-planar with the lower edge of the open end of the cylindrical member and an upper edge, an aperture extending through each end of the cross member at a location radially remote from the axis of the cylindrical member and the side wall of the cylindrical member; and a pair of rigid arms, each arm having a lower aperture at its lower end, the aperture of each arm positionable in axial alignment with an associated aperture of the cross member, upper apertures in the arms at the upper extents thereof positionable in axial alignment above the central axis of the cylindrical member, each of the arms being formed with a bend whereby the arms may extend upwardly then angled inwardly when the apertures at the upper ends of the arm are in axial alignment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
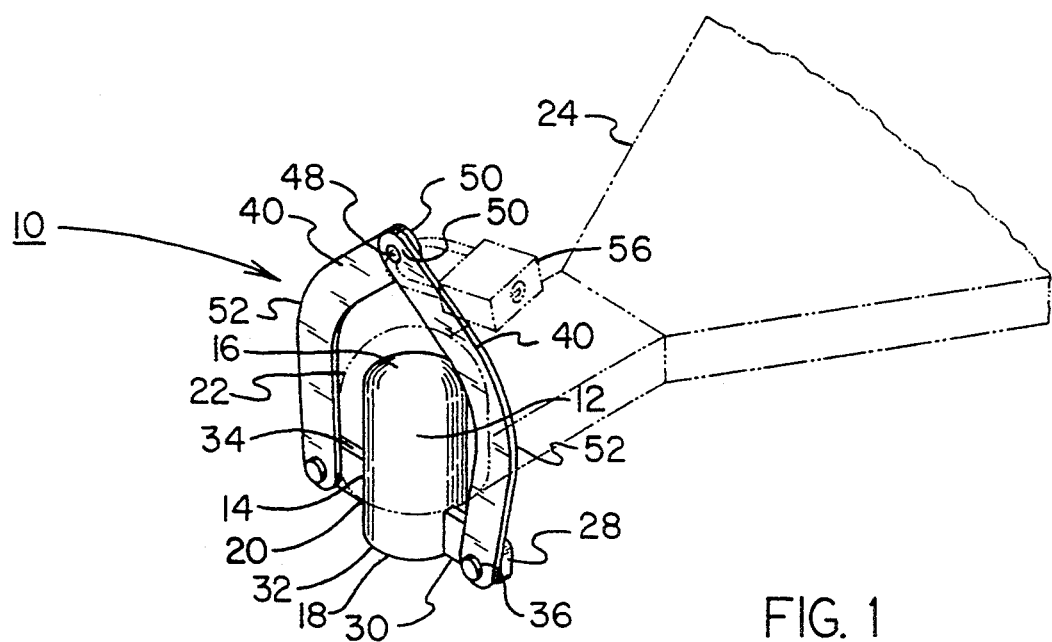
FIG. 1 is a perspective view of the preferred embodiment of the apparatus to preclude the theft or unauthorized use of a trailer constructed in accordance with the principles of the present invention.
Figure 2:
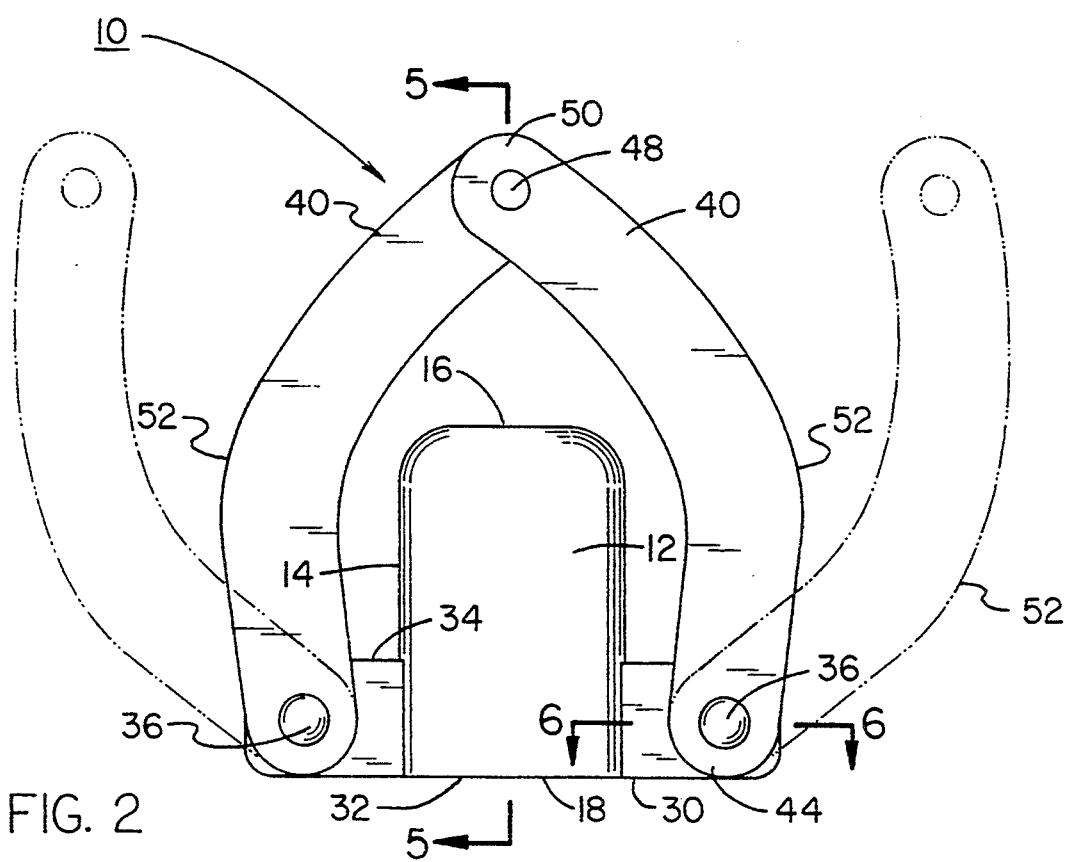
FIG. 2 is a front elevational view of the apparatus shown in FIG. 1 but also illustrating the arm in an open configuration.
Figure 3:
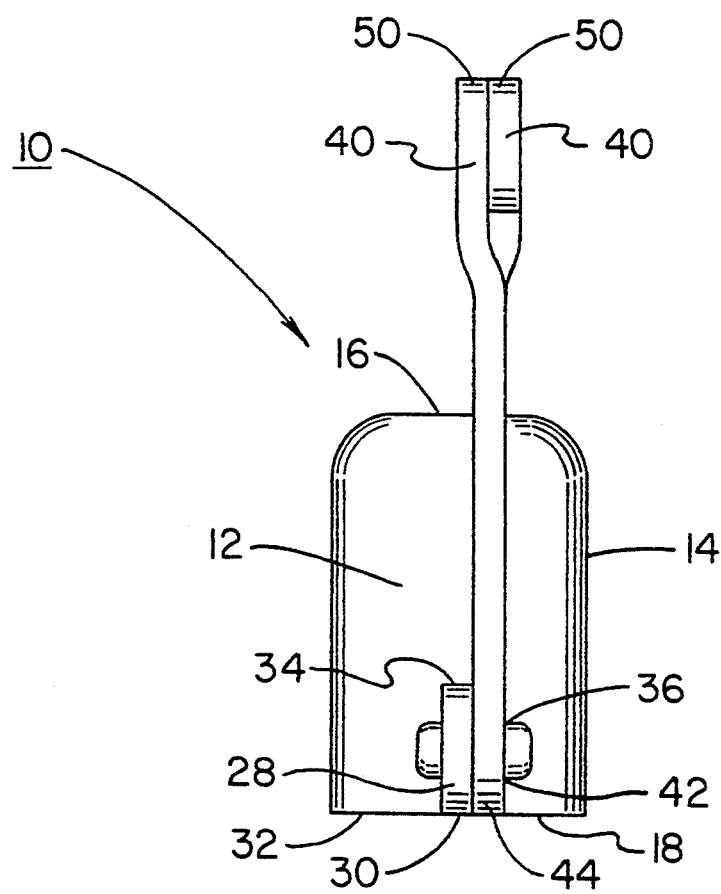
FIG. 3 is a side elevational view of the apparatus shown in FIGS. 1 and 2.
Figure 4:
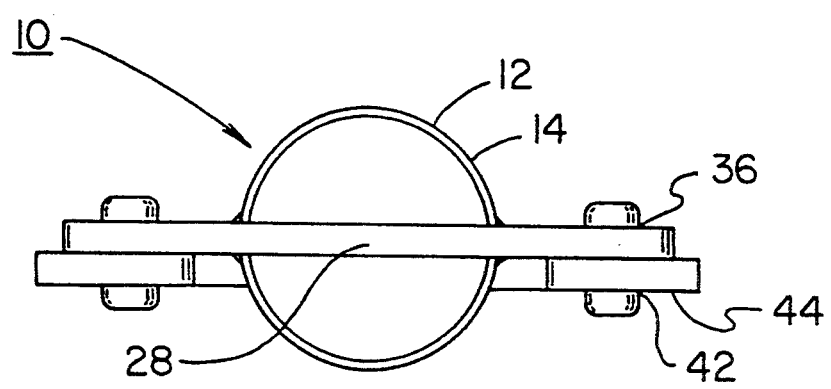
FIG. 4 is a top elevational view of the device shown in FIG. 3.
Figure 5:
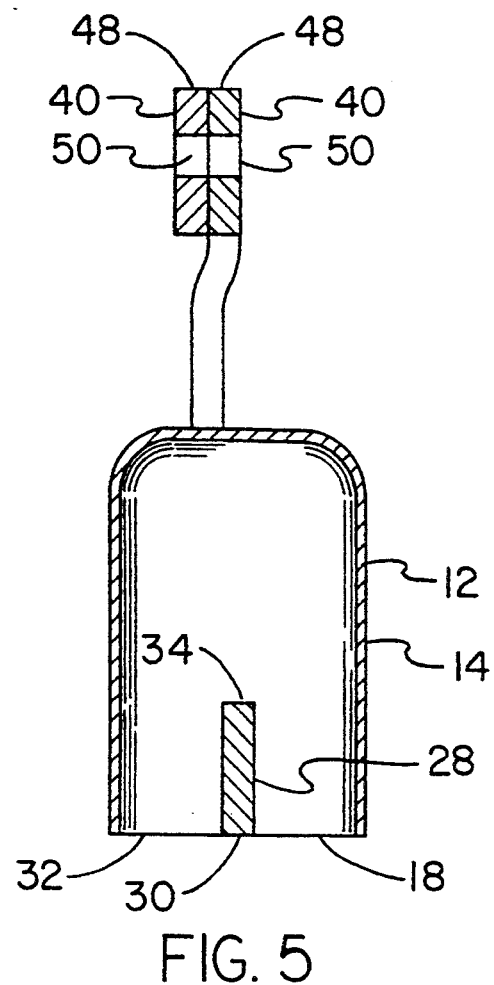
FIG. 5 is a cross sectional view taken along line 5—5 of FIG. 2.
Figure 6:
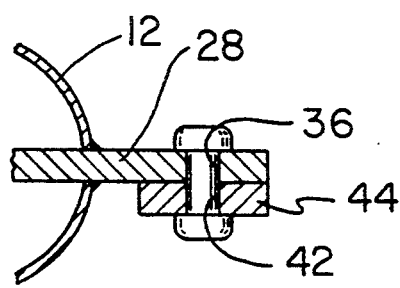
FIG. 6 is a cross sectional view taken along line 6—6 of FIG. 2.

With reference now to the drawings, and in particular to FIG. 1 thereof, the preferred embodiment of the new and improved apparatus to preclude the theft or unauthorized use of a trailer embodying the principles and concepts of the present invention and generally designated by the reference numeral 10 will be described.

The present invention, the new and improved apparatus to preclude the theft or unauthorized use of a trailer is comprised of a plurality of component elements. Such component elements in their broadest context, include a cylindrical member, a cross bar, rigid arms and a padlock. Such components are individually configured and correlated with respect to each other so as to attain the desired objectives.

The central element of the present system 10 is a cylindrical member 12. The cylindrical member is formed of a rigid material, preferably carbon steel, and is positioned in a vertical orientation about a central vertical axis. The cylindrical member has a cylindrical side wall 14, a closed top 16 and an open bottom 18. The closed top is in a generally spherical configuration. The cylindrical member also has an upper extent which is positionable in the downwardly facing recess 20 of the ball 22 of a trailer hitch 24. The lower extent of the cylindrical member is located beneath the components of the ball.

The next element of the system 10 is a cross bar 28. The cross bar is positioned in a horizontal orientation during operation and use. It extends diametrically through the side wall of the cylindrical member. It has a lower edge 30 which is coplanar with the lower edge 32 of the cylindrical member. The upper edge 34 of the cross member is, during operation and use, in proximity beneath the lower open end of the recess of the ball. An aperture 36 extends through each end of the cross member at a location radially remote from the axis of the cylindrical member and radially remote from the side wall of the cylindrical member.

Next provided is a pair of rigid arms 40. Each arm has a lower aperture 42 at its lower end 44. Such aperture of each arm is positionable in axial alignment with an associated aperture of the cross member. A rivet allows for rotational motion therebetween. Upper apertures 48 are also provided in the arms at the upper extents 50 thereof. Such upper apertures are positionable in axial alignment above the central axis of the cylindrical member during operation and use. In such orientation, the ball of the trailer hitch is located beneath the arms and above the cylindrical member. Each of the arms is formed with a bend 52 at its central extent. In this manner, the arms may extend upwardly and then angled inwardly when the apertures at the upper end of the arms are in axial alignment.

The last component of the system is a padlock 56. The padlock is positioned, during operation and use, through the upper apertures of the rigid arms. This is at the upper ends of such arms when in the locked position. In such locked position, there is precluded the coupling of the ball of the trailer hitch between the cylindrical member and arms. The ball may then not be mated to a mating component of a trailer hitch.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved apparatus to preclude the theft and unauthorized use of a trailer comprising, in combination:

a cylindrical member formed of a rigid material positionable in a vertical orientation, the cylindrical member having a cylindrical side wall, a closed top in a generally rounded configuration and an open bottom, the cylindrical member having an upper extent positionable within the downwardly facing sockets of a ball and socket type trailer hitch with a lower extent of the cylindrical member extending beyond a lower edge of the socket;

a cross bar positionable in a horizontal orientation extending diametrically through the side wall of the cylindrical member having a lower edge located co-planar with the lower edge of the open bottom of the cylindrical member and an upper edge of the cross bar in proximity to the lower edge of the socket of the trailer hitch, an aperture extending through each end of the cross bar at a location radially remote from a central axis of the cylindrical member and the side wall of the cylindrical member;

a pair of rigid arms, each arm having a lower aperture at a lower end, the aperture of each arm positionable in axial alignment with an associated aperture of the cross bar, each arm having an upper aperture at extents thereof positionable in axial alignment above the central axis of the cylindrical member, each of the arms being formed with a bend in its central extent whereby the arms extend upwardly then angled inwardly when the upper apertures at the upper extents of the arm are in axial alignment; and a padlock positioned through the upper apertures at the upper extents of the arms when in a locked position to preclude the coupling of the socket of the trailer hitch to a mating component of a trailer hitch.

2. An apparatus to preclude the theft and unauthorized use of a trailer comprising:

a cylindrical member formed of a rigid material positionable in a vertical orientation, the cylindrical member having a cylindrical side wall, a closed top in a generally rounded configuration and an open bottom, the cylindrical member having an upper extent positionable within a downwardly facing socket with a lower extent of the cylindrical member extending beyond a lower edge of the socket;

a cross bar positionable in a horizontal orientation extending diametrically through the side wall of the cylindrical member having a lower edge located co-planar with the lower edge of the open bottom of the cylindrical member and an upper edge of the cross bar in proximity to the lower edge of the socket of the trailer hitch, an aperture extending through each end of the cross bar at a location radially remote from a central axis of the cylindrical member and the side wall of the cylindrical member; and a pair of rigid arms, each arm having a lower aperture at a lower end, the aperture of each arm positionable in axial alignment with an associated aperture of the cross bar, each arm having an upper aperture at upper extents thereof positionable in axial alignment above the central axis of the cylindrical member, each of the arms being formed with a bend whereby the arms extend upwardly then angled inwardly when the upper apertures at the upper extents of the arm are in axial alignment.

3. The apparatus as set forth in claim 2 and further including:

a padlock positioned through the upper apertures at the upper extents of the arms when in a locked position to preclude the coupling of the socket of the trailer hitch to a mating component of a trailer hitch.

* * * * *